J. V. Jenkins.

Sheep Shearing Mach.

Nº 18,151.    Patented Sept. 8, 1857.

UNITED STATES PATENT OFFICE.

J. V. JENKINS, OF JACKSON, MICHIGAN.

SHEEP-SHEARING MACHINE.

Specification forming part of Letters Patent No. 18,151, dated September 8, 1857; Reissued May 14, 1867, No. 2,614.

*To all whom it may concern:*

Be it known that I, J. V. JENKINS, of Jackson, in the county of Jackson and State of Michigan have invented a new and useful Improvement in Implements for Shearing Sheep; and I do hereby declare that the following is a full, clear, and exact description of the same, reference being had to the annexed drawings, making a part of this specification, in which—

Figure 1:
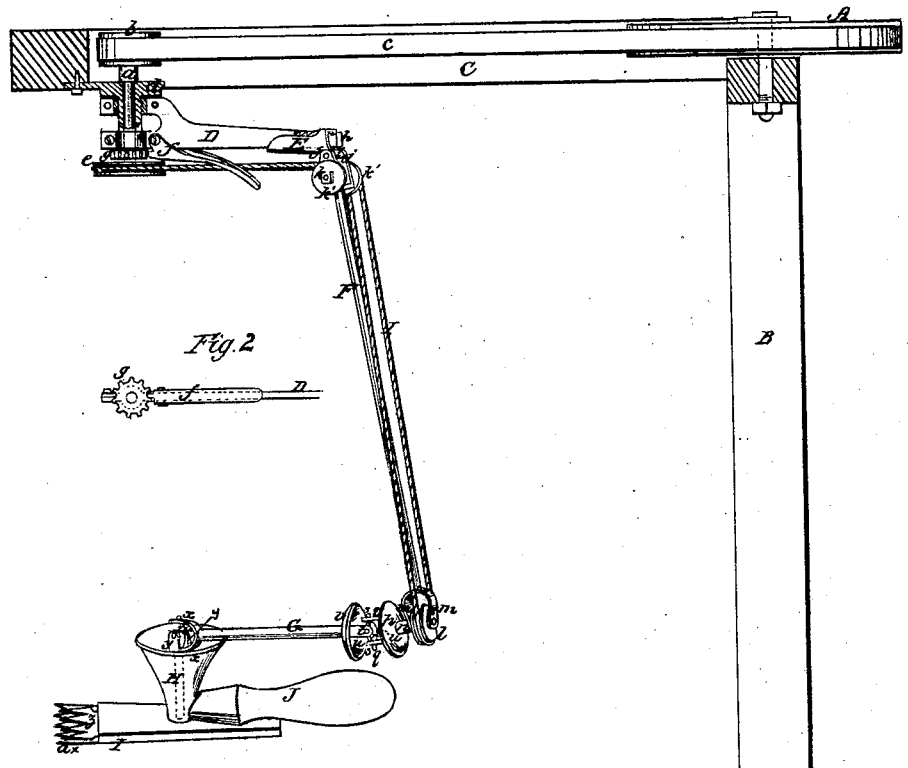
Figure 2:
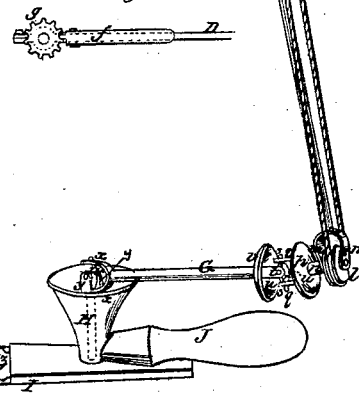

Figure 1 is an elevation of my improvement. Fig. 2 is a detached inverted plan of the crane of ditto.

Similar letters of reference indicate corresponding parts in the two figures.

This invention relates chiefly to an improvement on a sheep-shearing device formerly patented by me, and consists in the peculiar means employed for transmitting motion from the driving or power pulley to the cutting device whereby the cutting device, while being operated from the driving shaft, may be passed over the body of the animal in any direction and be entirely under the control of the operator.

To enable those skilled in the art to fully understand and construct my invention I will proceed to describe it.

A represents a pulley which is placed at the upper part of a vertical frame B, and C is a horizontal frame attached to the upper end of the frame B. At the end of the frame C a vertical shaft ($a$) is placed, said shaft having a pulley ($b$) on it, and ($c$) is a belt which passes around the pulleys A ($b$).

The shaft ($a$) is fitted within a socket or tube ($d$) which is permanently attached to the frame C, and a pulley ($c$) is attached to the lower end of said shaft, and on the socket or tube ($d$) a horizontal bar D is fitted or hung, said bar being allowed to turn freely on the socket. The bar D is secured in any desired position, or is prevented from turning by means of a spring catch ($f$) which fits into a notched flanch ($g$) at the lower end of the socket or tube ($d$), see Fig. 2 in which the catch and flanch are shown more particularly.

On the bar D a slide E is fitted or placed horizontally and to the outer end of this slide a rod or shaft F is attached by a joint ($h$). This joint may be formed by having the end of the rod or shaft F forked, and having a pin ($i$) attached to the end of the slide E, the ends of the pin ($i$) fitting in the ends of the two prongs ($j$) ($j$) of the fork.

A small rod or shaft ($k$) runs through the two prongs ($j$) ($j$) and a pulley ($k'$) is placed on each end  The lower end of the rod or shaft F' is forked and a pulley ($l$) is fitted between the two prongs ($m$) ($m$) of said fork. The pulley is placed on a small shaft ($n$) which passes through the prongs ($m$) ($m$) and has a concave or disk-shaped guard ($p$) at one end. This guard has a fork or two prongs ($q$) ($q$) attached to it, between which prongs a disk ($r$) is placed, said disk having a pin ($s$) at opposite sides of its periphery, the pins fitting loosely in the ends of the prongs. The disk ($r$) has also two pins ($t$) on its periphery at opposite sides the line of the pins ($t$) intersecting at right angles the line of the pins ($s$).

The ends of the pins ($t$) are fitted in the ends of prongs ($u$) ($u$) which prongs are attached to a disk-shaped guard ($v$) which is precisely similar to the guard ($p$). The guard ($v$) is attached to a rod or shaft G, which is forked at its lower end and has a disk ($w$) fitted between the prongs ($x$) ($x$) thereof, said disk being also fitted between prongs ($y$) attached to a cam-shaft H, which drives or actuates the cutters ($z$) which work over the stationary fingers ($a^*$) which are formed at the end of a plate I, said plate being attached to a stock or handle J.

The cutting device, formed of the cutters ($z$) placed over the stationary fingers ($a^*$) and actuated by the cam shaft H, is precisely the same as the one described in the patent formerly obtained by me.

The forks with the disks fitted between them form universal joints, and in connection with the joint ($h$) allow the cutting device to be moved in either direction while the guards ($p$) ($v$) limit the movement of the rods F, G, as regards their relative position with each other so that motion may always be transmitted from the shaft F to the shaft G without endangering the universal joint which connects the two shafts. A cord I passes around the pulley ($c$), pulleys ($k'$) and pulley ($l$).

From the above description of parts it will be seen that the cutting device may be moved in either direction, and that the bar D may be swung around on the shaft (*a*) and secured at any desired point. The operator sits directly underneath the shaft (*a*), and by the arrangement of parts as herein described has perfect control over the cutting device while it is in operation.

I do not claim the cutting device, formed of the vibrating cutters (*z*), working over the stationary fingers (*a**), for this has been previously used; but,

Having thus described my invention, what I claim as new, and desire to secure by Letters-Patent, is:

Connecting together the two shafts F, G, and also the shaft G to the cam shaft H by universal joints, the connecting joint of the shafts F, G, being provided with guards (*p*) (*v*) and connecting the upper end of the shaft F, by a joint (*h*) to the slide E on the swinging bar D substantially as shown and described for the purpose set forth.

J. V. JENKINS.

Witnesses:
J. B. PIERCE,
J. L. HOLMES.

[FIRST PRINTED 1912.]